United States Patent [19]
Ellerbrok

[11] Patent Number: 5,662,354
[45] Date of Patent: Sep. 2, 1997

[54] GAS BAG FOR A RESTRAINING SYSTEM IN VEHICLES AND A FABRIC FOR THE PRODUCTION THEREOF

[75] Inventor: Norbert Ellerbrok, Alfdorf, Germany

[73] Assignee: TRW Repa GmbH, Alfdorf, Germany

[21] Appl. No.: 416,904

[22] PCT Filed: Aug. 16, 1994

[86] PCT No.: PCT/EP94/02722

§ 371 Date: Apr. 13, 1995

§ 102(e) Date: Apr. 13, 1995

[87] PCT Pub. No.: WO95/05296

PCT Pub. Date: Feb. 25, 1995

[30] Foreign Application Priority Data

Aug. 17, 1993 [DE] Germany .......... 43 27 649.0

[51] Int. Cl.$^6$ .......................... B60R 21/16; B60R 21/28
[52] U.S. Cl. .......................... 280/743.1; 280/739
[58] Field of Search .................... 280/743.1, 728.1, 280/739

[56] References Cited

U.S. PATENT DOCUMENTS

| | | |
|---|---|---|
| 3,937,488 | 2/1976 | Wilson et al. |
| 5,093,163 | 3/1992 | Krummheuer et al. ......... 280/743.1 |
| 5,518,269 | 5/1996 | Storey et al. ......... 280/743.1 |

FOREIGN PATENT DOCUMENTS

| | | |
|---|---|---|
| 2091283 | 1/1972 | France . |
| 45144 | 1/1992 | Japan . |
| 4-159158 | 6/1992 | Japan ......... 280/739 |
| 578946 | 3/1993 | Japan . |
| 5-195419 | 8/1993 | Japan . |
| 2265122 | 9/1993 | United Kingdom ......... 280/739 |

Primary Examiner—Eric D. Culbreth
Attorney, Agent, or Firm—Tarolli, Sundheim, Covell, Tummino & Szabo

[57] ABSTRACT

An air bag for a vehicle occupant restraint system comprises several sewn fabrics parts. All fabric parts consist of fabric which has the same fiber density and filament yarn. The gas permeability curve of the entire gas bag increases as a function of the internal gage pressure. At a gage pressure of approximately 10 kPa the permeability is at a value between approximately 0.4 and approximately 1.0 m$^3$/s. On further increases in gage pressure to values between approximately 10 kPa and approximately 20 kPa, the gas permeability of the air bag reaches a maximum and then decreases when the gage pressure is above approximately 20 kPa to at least approximately 40 kPa. This form of the gas permeability curve means that hardness of the air bag is automatically regulated in order to provide low hardness during the initial pressure build up. A high impact intensity penetration by the occupant into the air bag is prevented by increased hardness due to relatively low permeability of the air bag material at high pressures in the air bag.

10 Claims, 2 Drawing Sheets

GAS BAG FOR A RESTRAINING SYSTEM IN VEHICLES AND A FABRIC FOR THE PRODUCTION THEREOF

The invention relates to a gas bag for a restraining system in vehicles, comprising a wall of a plurality of sewn together parts of uncoated fabric, of which the fabric part facing a vehicle occupant possesses a substantially lower permeability to gas than at least one fabric part facing away from the vehicle occupant. Furthermore, the invention relates to a fabric for the production of such a gas bag.

The protective action able to be produced by a gas bag is particularly dependent on its hardness in the inflated state. A soft gas bag will minimize the risk of injury as long as it is not hit through in a hard front-on collision or on the impact of a heavy passenger. Since when a passenger plunges into a gas bag the volume thereof will be reduced, there is also an increase in the interior pressure with the result that simultaneously there is an increase in the hardness of the gas bag. The desired effect is however largely overridden in the case of a conventional gas bag because the increased interior gage pressure involves the flow of gas through the escape holes or the gas-permeable wall parts of the gas bag. In accordance with ruling ideas in the art, the flow of gas through an escape opening or through a gas-permeable fabric is essentially a linear function of the internal gage pressure.

The invention is intended to provide a gas bag for a restraining system in vehicle, whose hardness is automatically regulated and within a wide range of relevant parameters, such as intensity of impact, weight of the vehicle occupant or the temperature-dependent generator performance, possesses the necessary value for an optimum protective action. This self-regulating property of the gas bag is achieved by control of the gas permeability of the wall thereof in a manner dependent on the internal gage pressure. The gas permeability curve, which represents the gas flow through the overall wall of the gas bag as a function of the internal gage pressure, must substantially depart from conventional notions, in accordance with which gas permeability increases approximately linearly with the internal gage pressure. In fact gas permeability must even decrease after reaching a maximum at a level of about 20 kPa. In accordance with the invention gas permeability of the overall wall of the gas bag has to increase, as far as a gage pressure of approximately 10 kPa with an increasing pressure, to a value between approximately 0.4 and approximately 1.0 m$^3$/s. Between gage pressure levels of approximately 10 kPa and approximately 20 kPa gas permeability will further increase, will reach a maximum and will then decrease again. Above a gage pressure of approximately 20 kPa to at least approximately 40 kPa gas permeability should not substantially increase, and should even preferably exhibit a clearly decreasing tendency. Owing to this form of the gas permeability curve the gas bag will be relatively soft in the initial phase of the build up of a gage pressure so that in the case of a light impact the danger of injury will be minimized. At high gage pressure levels, for example when a vehicle occupant does not have his seat belt fastened, there will be a hard impact. Since in this range the gas permeability of the gas bag wall will not further increase but will even preferably decrease, the gas bag will now possess the necessary substantial hardness.

In accordance with an advantageous further development of the invention all fabric parts of the gas bag wall consist of a fabric type which is the same as regards fiber density and filament yarn. The use of the same type of fabric for the fabric parts with different gas permeability is a great advantage, because all fabric parts will possess the same structural strength and the seam connections between the fabric part will be free of problems. The fact that for fabric parts with substantially different gas permeability values the same type of fabric may be suitable is a further notion of the invention. On the one hand it has been discovered that the gas permeability of a given fabric can be very different dependent whether the higher strain is present in the weft or warp direction. In the case of a generally cylindrical gas bag, simply on the basis of geometry, the strain will be twice as large in the peripheral direction as in the axial direction. If warp and weft are aligned in the axial and, respectively, peripheral directions, there will necessarily be a strain relationship of 1 to 2 between the strain values in the warp and weft directions. For the fabric part facing the vehicle occupant, that is to say the peripheral part of a generally cylindrical gas bag, the designer will consequently select that warp and weft alignment with which the lower gas permeability will be established. For other fabric parts, which must possess a substantially higher gas permeability, the warp and weft alignment is unimportant, since owing to the geometry of the gas bag there will be in any case a strain ratio of 1 to 1. In the case of a generally cylindrical gas bag this will be the side parts and in the case of a balloon or cushion-like gas bag there will, as a first approximation, be in any case a strain ratio of 1 to 1 all over.

On the other hand it has been discovered that gas permeability of the wall of a gas bag possesses a distinctly dynamic behavior. In accordance with conventional technology the gas permeability of gas bag fabric is measured at a constant pressure differential of 500 Pa. The invention is however based on the further notion that uncoated gas bag fabric may, under dynamic conditions which approach those on activation of the gas bag restraining system, possess a gas permeability, which substantially departs from the levels expected on the basis of measurement performed at a constant pressure difference. Accordingly in the determination of the gas permeability of the gas bag fabric it is preferred to simulate dynamic conditions as prevail during the activation of a gas bag restraining system. In a fashion dependent on the strain distribution due to the form of the inflated gas bag, in the individual fabric parts the alignment of warp and weft in the fabric parts will be so selected for the inflated gas bag that for each fabric part the predetermined gas permeability will become established for the variations in pressure difference expected in practice. Using one and the same type of fabric it is therefore possible to provide mutually different, readily reproduceably gas permeability values.

During dynamic investigation of gas permeability of uncoated gas bag fabrics it has been found that by varying conventional manufacturing parameters such as the type of weave and undulation at the fiber intersection points a form of the gas permeability curve may be obtained which comes very close to the ideal behavior, more particularly since above a maximum value of gas permeability at approximately 20 kPa the fabric "closes", that is to say behaves in quite a different way to that expected on the basis of conventional ideas. By systematic variation in the said parameters it is possible to produce a fabric with the desired behavior as regards gas permeability.

The invention furthermore provides two fabric types for the production of a gas bag in accordance with the invention. The first fabric type, which is intended for a fabric part facing the vehicle occupant and accordingly must be relatively "tight", is characterized in that its gas permeability increases up to a gage pressure of approximately 20 kPa under increasing pressure as far as a maximum value of less than approximately 0.4 m³/s, after this decreases again and above a gage pressure of approximately 30 kPa does not further substantially increase. The second fabric type is intended for the fabric part or parts facing away from the vehicle occupants and is characterized in that its gas permeability increases with pressure as far as a gage pressure of approximately 10 kpa as far as a value between approximately 0.3 and approximately 0.8 m³/s, increases further between gage pressure values of approximately 10 kPa and approximately 20 kPa, reaches a maximum and then decreases again and above a gage pressure of approximately 20 kPa up to at least approximately 40 kPa does not substantially increase, and preferably even decreases. The overall gas permeability of the gas bag is the sum of the two gas permeability curves, weighted proportionally for area, of such two types of fabric.

Further characteristics and advantages of the invention will be understood from the following detailed description in conjunction with the accompanying drawings.

Figure 1:
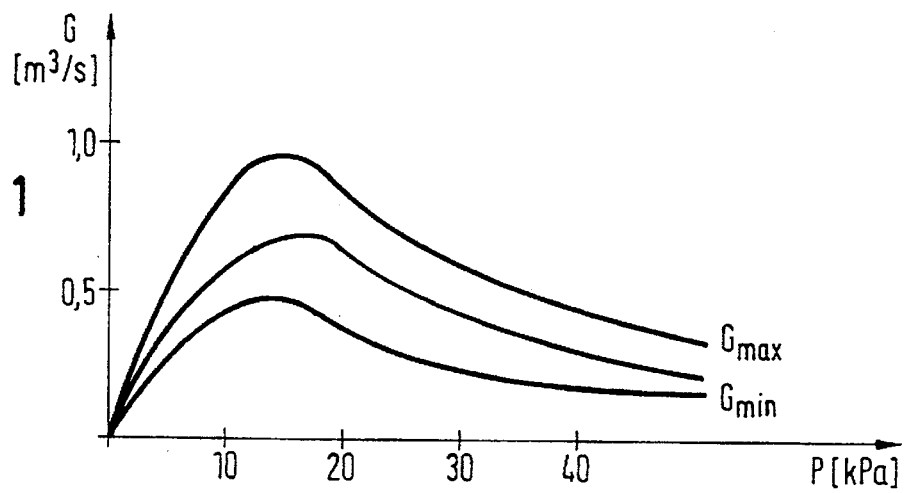
FIG. 1 is a graph for the gas permeability of an ideal gas bag under dynamic conditions.

FIG. 1 shows a graph depicting total gas flow through the wall of a gas bag as a function of gage pressure. For an ideal gas bag the gas permeability curve lies between an upper curve $G_{max}$ and a lower curve $G_{min}$ in FIG. 1. These two curves form a corridor in which the gas permeability curve of an ideal gas bag should lie. The curves shown in FIG. 1 are to be interpreted as follows: when the gas bag is deployed a gage pressure builds up within, which rapidly increases, it already resulting in the gas bag being fully deployed within a few milliseconds. This so-called charging time depends on the size of the gas bag and amounts to between approximately 20 and approximately 35 ms. The internal gage pressure of the gas bag reaches a maximum when the vehicle occupant plunges into the gas bag. The effective hardness of the gas bag is dictated by the gas permeability of its envelope or wall as a function of the internal gage pressure in the particular case. In the initial phase of gage pressure build up the gas bag should be soft to minimize the risk of injury in the case of light impact. When high values of this internal gage pressure occur, the impact will be hard, for instance in the case of the vehicle occupant not wearing a seat belt. By selection of the function of gas permeability against gage pressure the desired, self regulating behavior of the gas bag is obtained as illustrated in FIG. 1. For the optimum form of the gas permeability curve between the curves $G_{max}$ and $G_{min}$ several parameters, particularly vehicle type, gas generator, size and shape of the gas bag and the temperature obtaining, are determining.

It has further been found out that the ideal gas permeability curve of the gas bag as a whole can be achieved with a gas bag wall fabricated using an uncoated textile fabric, this not being in accordance with prior art practice. In prior art the suitability of fabric for a gas bag is found on the basis of its gas permeability which is statically measured for a fixed predefined pressure differential of 500 Pa. It is thus anticipated that the gas flow through the fabric will linearly depend on this difference in pressure. A gas permeability increasing linearly with pressure would be represented in the graph shown in FIG. 1 by a straight line passing through zero, whereas the ideal gas permeability curve running between the curves $G_{max}$ and $G_{min}$ in FIG. 1 can be defined as follows:

a) up to a gage pressure of roughly 10 kPa gas permeability increases with increasing pressure to a value between approximately 0.4 and approximately 1.0 m³/s, b) between the gage pressure values of approximately 10 kPa and approximately 20 kPa the gas permeability increases further up to a maximum value, before decreasing, and c) above a gage pressure of approximately 20 kPa in a range of up to at least approximately 40 kPa there is no significant increase in gas permeability.

At a gage pressure of above 20 kPa and in a range of up to at least approximately 40 kPa there is preferably a downward tendency for the gas permeability. It will be seen also schematically in FIG. 1 that the gas permeability curve preferably passes through a point of inflection at gage pressure values of more than approx. 20 kPa. Finally, it will be seen that the gas permeability preferably overproportionally increases up to a gage pressure of 10 kPa.

Uncoated textile fabric possessing the desired gas permeability can be manufactured by the systematic selection of conventional weave parameters. It is important that measurement of the gas permeability of a fabric be performed dynamically and that the strain relationships in the inflated gas bag be taken into account.

Since the entire process of expansion the compression of the gas bag is completed within a time of approximately 100 to 150 ms, it is necessary for the experimental determination of gas permeability of the fabric to be performed with a pressure pulse, which reaches the gage pressure values occurring within a comparable time.

Since the gas bag preferably possesses a low gas permeability in its part facing the vehicle occupant, the form of the gas permeability curve indicated in FIG. 1 must be predominantly obtained by the fabric in the other portions of the gas bag. If the gas bag is composed of different fabric parts, the fabric parts facing the occupant must have a substantially lower gas permeability than the fabric parts facing away from it. The gas permeability curve indicated in FIG. 1 is then the sum of the two gas permeability curves, weighted proportionally for area, of such two types of fabric utilized. The fabric part facing the occupant is preferably "gas tight", i.e. its gas permeability is to only increase to a marginal extent when unilaterally subjected to pressure for at least approximately 100 ms, at the most at least above a value of approximately 10 kPa and up to at least approximately 40 kPa; preferably it even decreases to a substantial extent. Under such conditions uncoated fabric can be employed, whose gas permeability, given a static pressure load, and a pressure difference of 500 PA amounts to more than 12 l/min.dm², as for example 15 to 18 l/min.dm².

Figure 2:
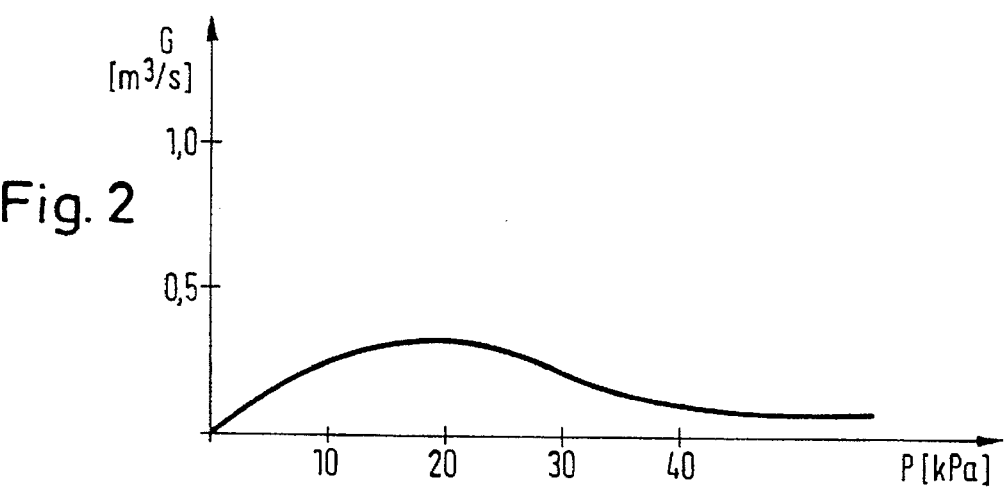
FIG. 2 is a corresponding graph for a relatively dense fabric type.

The gas permeability curve of such a fabric type is indicated in FIG. 2. This curve can be described as follows: up to an internal gage pressure of approximately 20 kPa the gas permeability will increase with increasing pressure to a maximum value of less than approximately 0.4 m³/s, whereafter it decreases and above an internal gage pressure value of approximately 30 kPa does not substantially increase any more but remains at a relatively low value.

Figure 3:
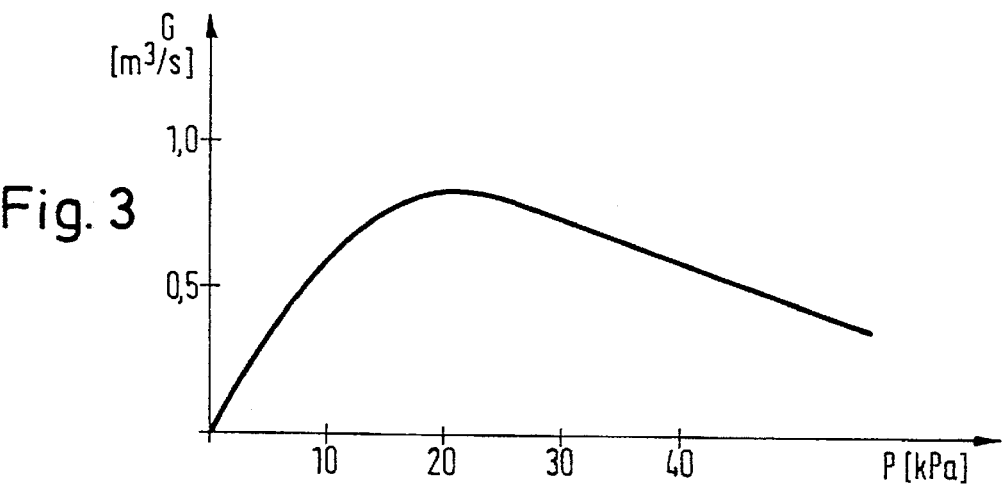
FIG. 3 is a corresponding graph for a relatively gas permeable fabric type.

The gas permeability curve for the other type of fabric, which is to possess a comparatively high gas permeability, is indicated in FIG. 3. This curve can be described as follows: up to an internal gage pressure of approximately 10 kPa the gas permeability will increase with increasing pressure to a value between approximately 0.3 and approximately 0.8 m³/s; between gage pressure values of approximately 10 kPa and approximately 20 kPa the gas permeability will increase still further, will reach a maximum and will then decrease again; above an internal gage pressure of approximately 20 kPa to at least approximately 40 kPa gas permeability will not substantially increase, and preferably will even decrease.

The two gas permeability curves tend to have the same form, but are however at different levels.

In order to achieve the desired form of the gas permeability curve for an uncoated textile fabric, more particularly the following parameters are systematically selected: fiber density, fiber type (polymer and shrink behavior), weave, undulation and finishing. In order to provide a substantial simplification of fabrication of the gas bag from different portions of fabric, despite the completely different gas permeability behavior of the different fabric parts types of fabric which are the same as regards fiber density and weave will be employed.

The significant parameters influencing the gas permeability curve are type of weave and undulation. Thus by having weaves with warp and weft floats extending over two or more fibers with a plain weave connection of the fiber after each float to strengthen the fabric, the pore size at the adjoining intersection points in the fabric and accordingly also the air permeability may be increased while having the same fiber density. Under a tensile strain occurring with an increasing internal gage pressure the pore size will also be increased owing to the stretching of the fabric's structure with the result that at the floating fiber intersection points there will be more space for the widening of the filament position, something which on a further increase in the internal gage pressure will lead to a tendency for the gas permeability to decrease. If at all existing strain ratios between warp and weft, i.e. 1 to 1, 2 to 1 or 1 to 2, the fabric is to possess the same gas behavior, the weave is so designed that there is the same fiber undulation and the same fiber binding and consequently the same structural stretch in the warp and weft directions. The warp and weft alignment in the different fabric parts of the gas bag does then not have any substantial effect on gas permeability. For fabric parts, which in the inflated gas bag have, owing to the geometry thereof, a strain ratio departing from 1 to 1 for the warp and weft, it is on the other hand possible to systematically vary the weave and undulation in the warp and weft directions so that such strain ratio can be utilized in order to affect gas permeability.

Figure 4A:
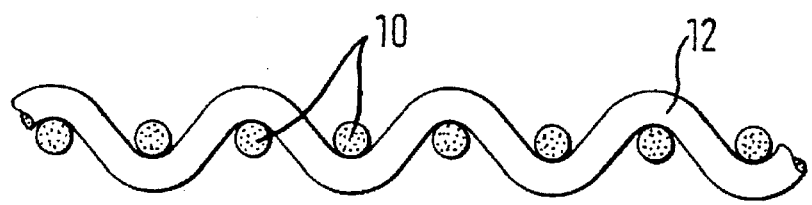
FIGS. 4a to 4d are diagrammatic representations of different weave and undulation states in the unloaded condition and under strain.
Figure 4B:
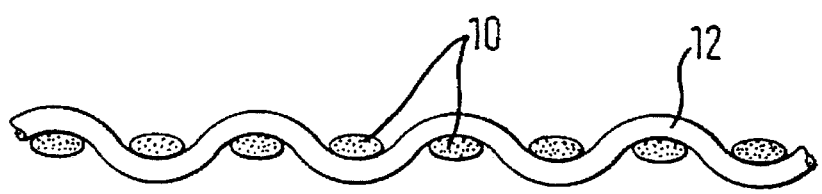
Figure 4C:
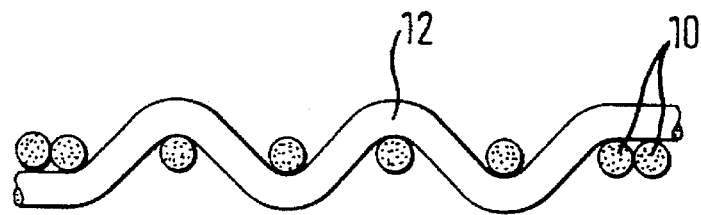

FIGS. 4a through 4c illustrate the effect of a fabric "closing" with increasing internal gas bag pressure. FIG. 4a shows diagrammatically a section taken through a plain weave fabric without floats in the unloaded state. The warp fibers are referenced 10, the weft fibers are referenced 12. The undulation of the weft fibers will be noted. Under a tensile strain in the weft direction, as shown in FIG. 4b, undulation will be reduced, the warp and weft ends 10 and 12 are thrust against one another and thereby flattened so that the pore size at the points of intersection of the fibers is reduced. The effective flow cross section through the fabric diminishes so that the gas permeability will also be decreased.

Figure 4D:
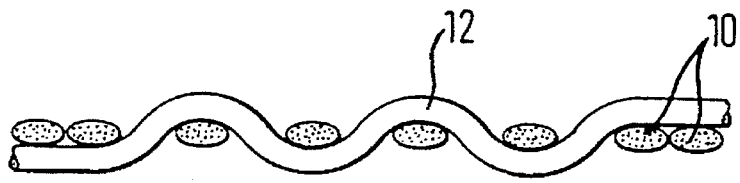

The same effect will be seen in FIGS. 4c and 4d. FIG. 4c shows a type of fabric whose weft fiber 12 has floats extending in each case over two warp ends 10 in the unloaded condition. FIG. 4d shows the same type of fabric under a tensile strain in the direction of the weft ends 12.

I claim:

1. A gas bag for a restraining system in a vehicle having a wall comprising a plurality of sewn together parts of uncoated fabric, one of which faces a vehicle occupant, wherein the fabric part facing the vehicle occupant possesses a substantially lower permeability to gas than at least one fabric part facing away from the vehicle occupant, characterized in that the gas permeability of the overall wall a) increases to a value between about 0.4 and about 1.0 m³/s with a pressure increasing up to a gage pressure of about 10 kPa, b) between gage pressure levels of about 10 kPa and about 20 kPa further increases, reaches a maximum and then decreases, and c) above a gage pressure value of about 20 kPa to at least about 40 kPa does not substantially increase.

2. The gas bag as claimed in claim 1, characterized in that above a gage pressure of about 20 kPa the gas permeability of the wall has a decreasing tendency in a range as far as at least about 40 kPa.

3. The gas bag as claimed in claim 2, characterized in that a gas permeability versus internal gage pressure curve of the gas bag runs through a point of inflection above a value of about 20 kPa.

4. The gas bag as claimed in claim 1, characterized in that all fabric parts consist of a fabric which is identical with respect to fiber density and filament yarn.

5. A fabric for use as the fabric part facing the vehicle occupant for use with the gas bag as claimed in claim 1, characterized in that its gas permeability increases up to a maximum value of less than about 0.4 m³/s, up to a gage pressure of about 20 kPa, under increasing pressure, then decreases and above a gage pressure of about 30 kPa does not substantially increase further.

6. The fabric as claimed in claim 5, characterized in that a gas permeability versus internal gage pressure curve of the fabric facing the vehicle occupant runs through a point of inflection above a value of about 20 kPa.

7. The fabric as claimed in claim 5, characterized in that it possesses the same undulation and the same fabric construction in warp and weft directions.

8. The fabric as claimed in claim 5, characterized by warp and weft floats extending over at least two ends, each such float being followed by plain weave.

9. A fabric for use as the fabric part facing away from the vehicle occupant for use with the gas bag as claimed in claim 1, characterized in that its gas permeability a) increases to a value between about 0.3 and about 0.8 m³/s with pressure increasing up to a gage pressure of about 10 kPa, b) between gage pressure levels of about 10 kPa and about 20 kPa further increases, reaches a maximum and then decreases, and c) above a gage pressure value of about 20 kPa to at least about 40 kPa does not substantially increase.

10. The fabric as claimed in claim 9, characterized in that above a gage pressure of about 20 kPa such gas permeability has a decreasing tendency in a range as far as at least about 40 kPa.

* * * * *